(12) United States Patent
Wang

(10) Patent No.: US 12,424,841 B2
(45) Date of Patent: Sep. 23, 2025

(54) PE LINE PROTECTION SYSTEM FOR POWER UTILIZATION AND CHARGING APPARATUS, AND POWER UTILIZATION AND CHARGING APPARATUS

(71) Applicant: Changchun Jetty Automotive Technology Co., Ltd., Changchun (CN)

(72) Inventor: Chao Wang, Changchun (CN)

(73) Assignee: CHANGCHUN JETTY AUTOMOTIVE TECHNOLOGY CO., LTD., Jilin (CN)

( * ) Notice: Subject to any disclaimer, the term of this patent is extended or adjusted under 35 U.S.C. 154(b) by 175 days.

(21) Appl. No.: 18/265,562

(22) PCT Filed: Dec. 13, 2021

(86) PCT No.: PCT/CN2021/137346
§ 371 (c)(1),
(2) Date: Jun. 6, 2023

(87) PCT Pub. No.: WO2022/127721
PCT Pub. Date: Jun. 23, 2022

(65) Prior Publication Data
US 2024/0030704 A1 Jan. 25, 2024

(30) Foreign Application Priority Data
Dec. 17, 2020 (CN) .......................... 202023059783.0

(51) Int. Cl.
*H02H 7/00* (2006.01)
*H02H 1/00* (2006.01)
*H02H 7/20* (2006.01)

(52) U.S. Cl.
CPC ............ *H02H 7/20* (2013.01); *H02H 1/0007* (2013.01)

(58) Field of Classification Search
None
See application file for complete search history.

(56) References Cited

U.S. PATENT DOCUMENTS

| 2009/0015977 A1* | 1/2009 | Patel ........................ G06F 1/30 361/92 |
| 2011/0273803 A1 | 11/2011 | Huang |

(Continued)

FOREIGN PATENT DOCUMENTS

| CN | 104155505 A | 11/2014 |
| CN | 110435457 A | 11/2019 |

(Continued)

OTHER PUBLICATIONS

International search report issued for counterpart PCT Application No. PCT/CN2021/137346, dated Mar. 10, 2022, 8 pgs.

(Continued)

*Primary Examiner* — Stephen W Jackson
(74) *Attorney, Agent, or Firm* — LOZA & LOZA, LLP; Michael F. Fedrick

(57) ABSTRACT

A PE line protection system for a power utilization and charging apparatus, and a power utilization and charging apparatus, where the PE line protection system comprises a driving circuit (1) and a switch (2). The driving circuit (1) is used for controlling the switch (2) to cut off a PE line upon reception of a signal for indicating the abnormal connection of the PE line that is transmitted by the power utilization and charging apparatus. When the PE line is abnormally connected and a wrong current flows into the PE line, for example a live line or a live conductor is connected to the PE line, the switch (2) connected to the PE line can cut off the PE line in time, which can avoids the possibility of being electrified of a metal part of the apparatus and ensures the safety of the whole charging process.

10 Claims, 1 Drawing Sheet

(56) References Cited

U.S. PATENT DOCUMENTS

2013/0215549 A1 8/2013 Aragai et al.
2024/0042872 A1* 2/2024 Baier ........................ H02J 3/32

FOREIGN PATENT DOCUMENTS

CN         209858702 U    12/2019
CN         214044996 U     8/2021
DE     102012219542 A1    7/2013

OTHER PUBLICATIONS

Extended European Search Report issued on Nov. 20, 2024 for counterpart European Patent Application No. 21905650.4, 32 pages.

* cited by examiner

PE LINE PROTECTION SYSTEM FOR POWER UTILIZATION AND CHARGING APPARATUS, AND POWER UTILIZATION AND CHARGING APPARATUS

CROSS-REFERENCE TO RELATED APPLICATIONS

This application is the U.S. national stage of International Patent Application No. PCT/CN2021/137346, filed on Dec. 13, 2021, which claims the benefit of priority to Chinese Utility Model patent application No. 202023059783.0, entitled "PE line protection system for power utilization and charging apparatus, and power utilization and charging apparatus", and filed on Dec. 17, 2020, both of which is are hereby incorporated by reference in their entireties.

TECHNICAL FIELD

The present application relates to the field of PE line protection for a power utilization and charging apparatus, and in particular to a PE line protection system for power utilization and charging apparatus, and a power utilization and charging apparatus.

BACKGROUND

With the advent of 5G era, mobile power utilization and charging apparatus are increasingly used in modern society. The safety of power utilization and charging has become a common concern of the society. A power utilization and charging apparatus shall be grounded. However, when a wrong current flows into a PE (Protecting Earthing) line, for example, a live line or a live conductor is mistakenly connected to the PE line, the existing power utilization and charging apparatus cannot make a timely and effective treatment, and a metal part of the charging apparatus may be electrified, causing electric shock hazard to a human body and even life-threatening.

Therefore, it is a problem currently to be solved by those skilled in the art to provide a solution to the above technical problems.

SUMMARY

An object of the present application is to provide a PE line protection system for a power utilization and charging apparatus, and a power utilization and charging apparatus. When the PE line is abnormally connected and the wrong current flows into the PE line, a switch connected to the PE line can cut off the PE line in time, which on one hand avoids the possibility of being electrified of a metal part of the apparatus, prevents electrical shock hazards to a human body, ensures the safety of the whole charging process, and enables the apparatus to be charged safely without risk.

In order to solve the above-mentioned technical problem, the present application provides a PE line protection system for a power utilization and charging apparatus, comprising a driving circuit and a switch, wherein, an input end of the driving circuit is connected to an output end of the power utilization and charging apparatus, a driving end of the driving circuit is connected to a control end of the switch, a first end of the switch is connected to an output end of the PE line, and a second end of the switch is connected to an input end of the PE line;

the driving circuit is used for controlling the switch to cut off the PE line upon reception of a signal for indicating the abnormal connection of the PE line that is transmitted by the power utilization and charging apparatus.

Preferably, the driving circuit comprises a controllable switch module and a freewheeling circuit, wherein, a control end of the controllable switch module is connected to the output end of the power utilization and charging apparatus, a first end of the controllable switch module is connected to a first control end of the switch and an input end of the freewheeling circuit respectively, a second end of the controllable switch module is grounded, an output end of the freewheeling circuit is connected to a second control end of the switch, and a common end is connected to a power supply;

the driving circuit is used specifically for controlling the controllable switch module to be turned off such that the switch cuts off the PE line upon reception of a signal for indicating the abnormal connection of the PE line that is transmitted by the power utilization and charging apparatus.

Preferably, the controllable switch module comprises a first resistor and a first switch tube, wherein, a first end of the first resistor is connected to an output end of the power utilization and charging apparatus, a second end of the first resistor is connected to a control end of the first switch tube, a first end of the first switch tube is connected to the first control end of the switch and the input end of the freewheeling circuit respectively, and a second end of the first switch tube is grounded.

Preferably, the controllable switch module further comprises a second resistor and a second switch tube, wherein, a first end of the second resistor is connected to the first end of the first switch tube and a control end of the second switch tube respectively, a second end of the second resistor is connected to the power supply, a first end of the second switch tube is connected to the first control end of the switch and the input end of the freewheeling circuit respectively, and a second end of the second switch tube is grounded.

Preferably, the first switch tube and the second switch tube are both a triode, wherein, a base electrode of the triode serves as a control end of the first switch tube and the second switch tube, a collector electrode of the triode serves as a first end of the first switch tube and the second switch tube, and an emitter electrode of the triode serves as a second end of the first switch tube and the second switch tube.

Preferably, the freewheeling circuit is a first diode, wherein, an anode of the first diode serves as the input end of the freewheeling circuit, and a cathode of the first diode serves as the output end of the freewheeling circuit.

Preferably, the switch is one of a relay, a mos tube, a thyristor, a triode, or a combination thereof.

Preferably, the PE line protection system for a power utilization and charging apparatus further comprises a detection circuit, wherein, an input end of the detection circuit is connected to a control end of the power utilization and charging apparatus, and a detection end of the detection circuit is connected to the output end of the PE line;

the detection circuit is used for starting detection of an on-off state of the switch upon reception of a detection start signal transmitted by the power utilization and charging apparatus, and outputting a first detection value if it is detected that the switch is turned on; and outputting a second detection value if it is detected that the switch is turned off.

Preferably, the detection circuit comprises a third resistor, a fourth resistor, a third switch tube and a second diode, wherein, a control end of the third switch tube is connected to the control end of the power utilization and charging apparatus, a first end of the third switch tube is connected to a first end of the third resistor, a second end of the third resistor is connected to a first end of the fourth resistor and a common end serves as an output end of the detection circuit, a second end of the fourth resistor is connected to a cathode of the second diode, an anode of the second diode is connected to the power supply, and a second end of the third switch tube is connected to the output end of the PE line;

the detection circuit is used specifically for turning on the third switch tube upon reception of a detection start signal transmitted by the power utilization and charging apparatus, to start detection of an on-off state of the switch, and outputting a first detection value if it is detected that the switch is turned on; and outputting a second detection value if it is detected that the switch is turned off.

Preferably, the third switch tube is a triode, wherein, the base electrode of the triode serves as the control end of the third switch tube, the collector electrode of the triode serves as the first end of the third switch tube, and the emitter electrode of the triode serves as the second end of the third switch tube.

In order to solve the above technical problem, the present application further provides a power utilization and charging apparatus, comprising any of the PE line protection system of a power utilization and charging apparatus described above.

The present application provides a PE line protection system for a power utilization and charging apparatus, comprising a driving circuit and a switch. The driving circuit is used for controlling the switch to cut off the PE line upon reception of a signal for indicating the abnormal connection of the PE line that is transmitted by the power utilization and charging apparatus. It can be seen that when the PE line is abnormally connected and the wrong current flows into the PE line, for example a live line or a live conductor is connected to the PE line, DC error current or AC error current flows into the PE line, a switch connected to the PE line can cut off the PE line in time, which on one hand avoids the possibility of being electrified of the metal part of the apparatus, prevents electrical shock hazards to the human body, ensures the safety of the whole charging process, and enables the apparatus to be charged safely without risk.

The power utilization and charging apparatus provided by the present application has the same beneficial effect as the above described PE line protection system.

DESCRIPTION OF DRAWINGS

In order to more clearly explain the technical solution in the embodiments of the present application, drawings that need to be used in the prior art and the embodiments will be simply introduced below, obviously the drawings in the following description are merely some embodiments of the present application, and for those skilled in the art, it is also possible to obtain other drawings according to these drawings without making creative efforts.

DESCRIPTION OF EMBODIMENTS

The core of the present application is to provide a PE line protection system for a power utilization and charging apparatus, and a power utilization and charging apparatus. When the PE line is abnormally connected and a wrong current flows into the PE line, a switch connected to the PE line can cut off the PE line in time, which on one hand avoids the possibility of being electrified of a metal part of the apparatus, prevents electrical shock hazards to a human body, ensures the safety of the whole charging process, and enables the apparatus to be charged safely without risk.

In order to more clearly explain purpose, technical solution and advantages of the embodiment of the present application, hereinafter the technical solution in the embodiments of the present application will be described clearly and integrally in combination with the accompanying drawings in the embodiments of the present application, and obviously the described embodiments are merely part of the embodiments, not all of the embodiments. Any other embodiment obtained by those skilled in the art based on the embodiments of the present application without paying any creative labor fall within the protection scope of the present application.

Figure 1:
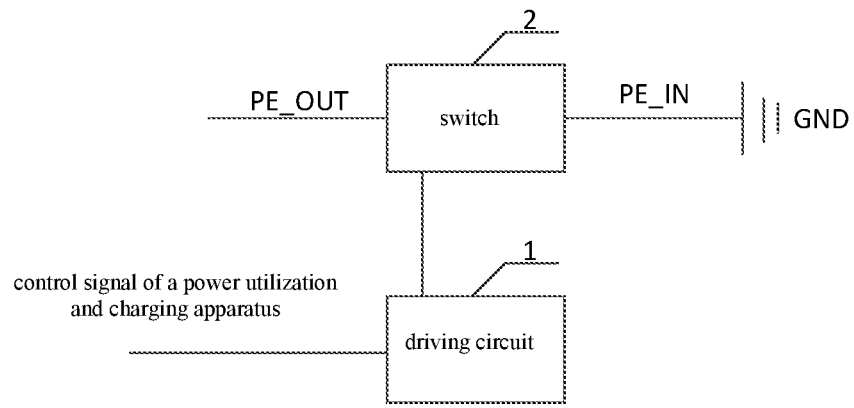
FIG. 1 is a structural schematic diagram of a PE line protection system for a power utilization and charging apparatus provided in an embodiment of the present application.

Referring to FIG. 1, FIG. 1 is a structural schematic diagram of a PE line protection system for a power utilization and charging apparatus provided in an embodiment of the present application.

The PE line protection system for a power utilization and charging apparatus comprises a driving circuit 1 and a switch 2, wherein, an input end of the driving circuit 1 is connected to an output end of the power utilization and charging apparatus, a driving end of the driving circuit 1 is connected to a control end of the switch 2, a first end of the switch 2 is connected to an output end of the PE line, and a second end of the switch 2 is connected to an input end of the PE line;

the driving circuit 1 is used for controlling the switch 2 to cut off the PE line upon reception of a signal for indicating the abnormal connection of the PE line that is transmitted by the power utilization and charging apparatus.

Specifically, the PE line protection system for a power utilization and charging apparatus provided by the present application comprises a driving circuit 1 and a switch 2, and the operating principle thereof is:

the power utilization and charging apparatus can detect an abnormal connection condition of the PE line, such as a live line or a live conductor being connected to the PE line, DC error current or AC error current flowing into the PE line, and generate a signal for indicating the abnormal connection of the PE line to the driving circuit 1 when there is an abnormal connection of the PE line. The driving circuit 1 controls the switch 2 to cut off the PE line upon reception of a signal for indicating the abnormal connection of the PE line that is transmitted by the power utilization and charging apparatus, which on one hand avoids the possibility of being electrified of the metal part of the apparatus, prevents electrical shock hazards to the human body, ensures the safety of the whole charging process, and enables the apparatus to be charged safely without risk.

Figure 2:
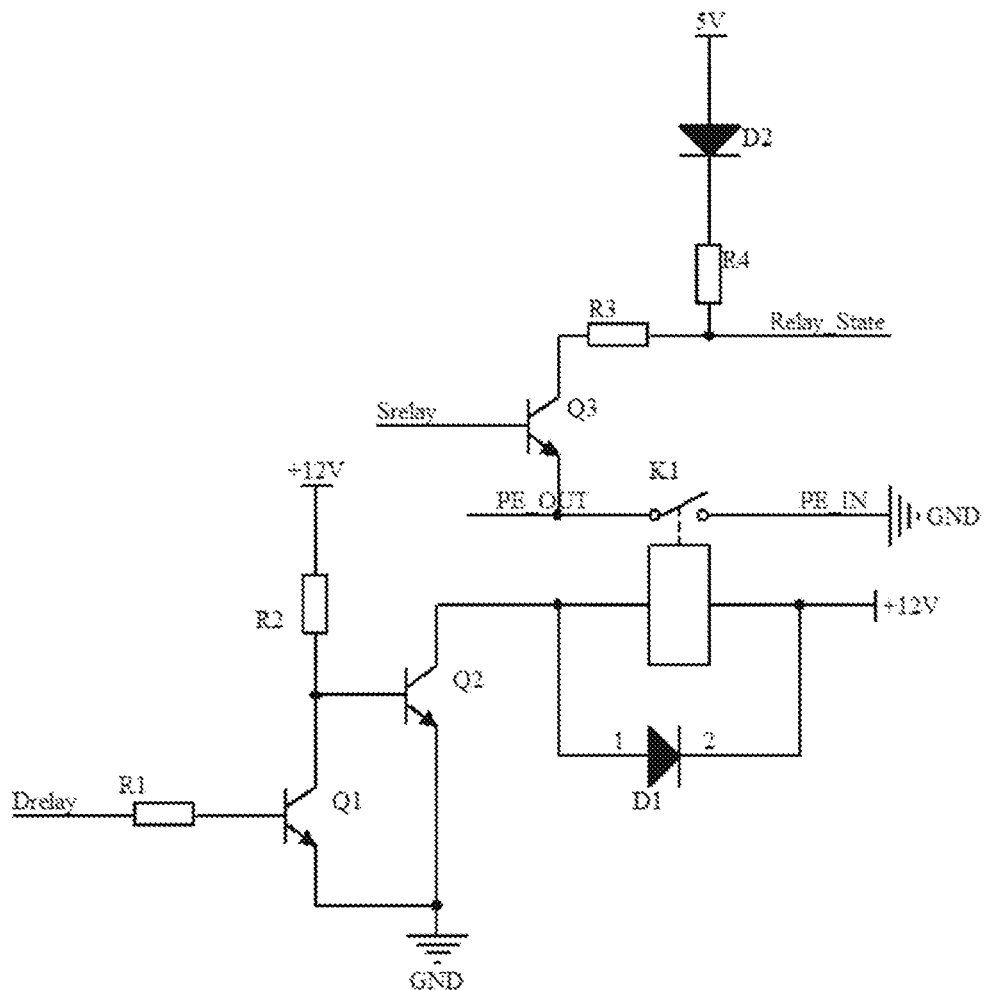
FIG. 2 is a specific structural schematic diagram of a PE line protection system for a power utilization and charging apparatus provided in an embodiment of the present application.

On the basis of the above embodiment:

Referring to FIG. 2, FIG. 2 is a specific structural schematic diagram of a PE line protection system for a power utilization and charging apparatus provided in an embodiment of the present application.

As an alternative embodiment, the driving circuit 1 comprises a controllable switch module and a freewheeling circuit, wherein, a control end of the controllable switch module is connected to the output end of the power utilization and charging apparatus, a first end of the controllable switch module is connected to a first control end of the switch 2 and an input end of the freewheeling circuit respectively, a second end of the controllable switch module is grounded, an output end of the freewheeling circuit is connected to a second control end of the switch 2, and a common end is connected to a power supply;

the driving circuit 1 is used specifically for controlling the controllable switch module to be turned off such that the switch 2 cuts off the PE line upon reception of a signal for indicating the abnormal connection of the PE line that is transmitted by the power utilization and charging apparatus.

Specifically, the driving circuit 1 of the present application comprises a controllable switch module and a freewheeling circuit, and the operating principle thereof is:

the driving circuit 1 controls the controllable switch module to be turned off upon reception of a signal for indicating the abnormal connection of the PE line that is transmitted by the power utilization and charging apparatus, at this time the switch 2 is de-energized, and the switch 2 is turned off to cut off the PE line.

In addition, the switch 2 has the function of storing electric energy, and the electric energy stored by the switch 2 itself will not disappear immediately after the switch 2 is de-energized. The function of the freewheeling circuit is to release the electric energy stored by the switch 2 after the switch 2 is de-energized, so as to avoid damaging the controllable switch module.

For example, the switch 2 is a relay, and the relay comprises a coil and a pull-in switch K1, wherein, a first end of the coil is connected to an input end of the freewheeling circuit, a second end of the coil is connected to an output end of the freewheeling circuit, a first end of the pull-in switch K1 is connected to an output end of the PE line, and a second end of the pull-in switch K1 is connected to an input end of the PE line. When the coil of the relay is de-energized, the pull-in switch K1 of the relay is turned off to cut off the PE line.

Of course, the switch 2 may also be a mos tube or a thyristor or a triode, which is not particularly limited in the present application.

As an alternative embodiment, the controllable switch module comprises a first resistor R1 and a first switch tube Q1, wherein, a first end of the first resistor R1 is connected to an output end of the power utilization and charging apparatus, a second end of the first resistor R1 is connected to a control end of the first switch tube Q1, a first end of the first switch tube Q1 is connected to the first control end of the switch 2 and the input end of the freewheeling circuit respectively, and a second end of the first switch tube Q1 is grounded.

Specifically, the controllable switch module of the present application comprises a first resistor R1 and a first switch tube Q1 (taking the first switch tube Q1 being a PNP-type triode as an example), and the operating principle thereof is:

the signal for indicating the abnormal connection of the PE line that is transmitted by the power utilization and charging apparatus is of high level, so that when the power utilization and charging apparatus outputs a signal (Drelay) indicating that the PE line is abnormally connected, the first switch tube Q1 is turned off, and the coil of the relay is de-energized, such that the pull-in switch K1 of the relay is turned off to cut off the PE line.

On the contrary, when the power utilization and charging apparatus does not output the signal for indicating the abnormal connection of the PE line, the first switch tube Q1 is turned on and the coil of the relay is energized, so that the pull-in switch K1 of the relay is turned on to turn on the PE line.

As an alternative embodiment, the controllable switch module further comprises a second resistor R2 and a second switch tube Q2, wherein, a first end of the second resistor R2 is connected to the first end of the first switch tube Q1 and a control end of the second switch tube Q2 respectively, a second end of the second resistor R2 is connected to the power supply, a first end of the second switch tube Q2 is connected to the first control end of the switch 2 and the input end of the freewheeling circuit respectively, and a second end of the second switch tube Q2 is grounded.

Specifically, the controllable switch module of the present application further comprises a second resistor R2 and a second switch tube Q2 (in this embodiment, taking the first switch tube Q1 and the second switch tube Q2 each being a NPN-type triode as an example), and the operating principle thereof is:

the signal for indicating the abnormal connection of the PE line that is transmitted by the power utilization and charging apparatus is of high level, so that when the power utilization and charging apparatus outputs a signal (Drelay) indicating that the PE line is abnormally connected, the first switch tube Q1 is turned on and the second switch tube Q2 is turned off, and the coil of the relay is de-energized, such that the pull-in switch K1 of the relay is turned off to cut off the PE line.

On the contrary, when the power utilization and charging apparatus does not output the signal for indicating the abnormal connection of the PE line, the first switch tube Q1 is turned off and the second switch tube Q2 is turned on, and the coil of the relay is energized, so that the pull-in switch K1 of the relay is turned on to turn on the PE line.

As an alternative embodiment, the first switch tube Q1 and the second switch tube Q2 are both triodes, wherein, a base electrode of the triode serves as a control end of the first switch tube Q1 and the second switch tube Q2, a collector electrode of the triode serves as a first end of the first switch tube Q1 and the second switch tube Q2, and an emitter electrode of the triode serves as a second end of the first switch tube Q1 and the second switch tube Q2.

Specifically, the first switch tube Q1 and the second switch tube Q2 of the present application can be selected from, but not limited to, triodes, and the present application is not particularly limited thereto.

As an alternative embodiment, the freewheeling circuit is a first diode D1, wherein, an anode of the first diode D1 serves as the input end of the freewheeling circuit, and a cathode of the first diode D1 serves as the output end of the freewheeling circuit.

Specifically, the freewheeling circuit of the present application can be selected from a first diode D1, and after the coil of the relay is de-energized, the electric energy stored in the coil can be released through the first diode D1.

As an alternative embodiment, the switch 2 is one of a relay, a mos tube, a thyristor, a triode, or a combination thereof.

Specifically, the contents of this embodiment have been described in the above embodiment, and will not be repeated here in this application.

As an alternative embodiment, the PE line protection system for a power utilization and charging apparatus further comprises a detection circuit, wherein, an input end of the detection circuit is connected to a control end of the power utilization and charging apparatus, and a detection end of the detection circuit is connected to the output end of the PE line;

the detection circuit is used for starting detection of an on-off state of the switch 2 upon reception of a detection start signal transmitted by the power utilization and charging apparatus, and outputting a first detection value if it is detected that the switch 2 is turned on; and outputting a second detection value if it is detected that the switch 2 is turned off.

Further, the PE line protection system for a power utilization and charging apparatus provided by the present application further comprises a detection circuit, and the operating principle thereof is:

the detection circuit is used for detecting the on-off state of the switch 2, and specifically for starting the detection of the on-off state of the switch 2 upon reception of a detection start signal transmitted by the power utilization and charging apparatus, and outputting a first detection value if it is detected that the switch 2 is turned on; and outputting a second detection value if it is detected that the switch 2 is turned off, so as to determining the on-off state of the switch 2 by the detection value output by the detection circuit.

As an alternative embodiment, the detection circuit comprises a third resistor R3, a fourth resistor R4, a third switch tube Q3 and a second diode D2, wherein, a control end of the third switch tube Q3 is connected to the control end of the power utilization and charging apparatus, a first end of the third switch tube Q3 is connected to a first end of the third resistor R3, a second end of the third resistor R3 is connected to a first end of the fourth resistor R4 and a common end serves as an output end of the detection circuit, a second end of the fourth resistor R4 is connected to a cathode of the second diode D2, an anode of the second diode D2 is connected to the power supply, and a second end of the third switch tube Q3 is connected to the output end of the PE line;

the detection circuit is used specifically for turning on the third switch tube Q3 upon reception of a detection start signal transmitted by the power utilization and charging apparatus, to start detection of an on-off state of the switch 2, and outputting a first detection value if it is detected that the switch 2 is turned on; and outputting a second detection value if it is detected that the switch 2 is turned off.

Specifically, the detection circuit of the present application comprises a third resistor R3, a fourth resistor R4, a third switch tube Q3 and a second diode D2 (taking the third switch tube Q3 being a NPN-type triode as an example), and the operating principle thereof is:

The detection start signal transmitted by the power utilization and charging apparatus is of high level, so when the power utilization and charging apparatus outputs the detection start signal (Srelay), the third switch tube Q3 is turned on. If the switch 2 is turned on, the detection value output by the detection circuit is approximately equal to the voltage division value of the third resistor R3 and the fourth resistor R4 to the power supply 5V; when the switch 2 is turned off, the detection value output by the detection circuit is approximately equal to the power supply 5V, so as to determining the on-off state of the switch 2 by the detection value output by the detection circuit.

As an alternative embodiment, the third switch tube Q3 is a triode, wherein, the base electrode of the triode serves as the control end of the third switch tube Q3, the collector electrode of the triode serves as the first end of the third switch tube Q3, and the emitter electrode of the triode serves as the second end of the third switch tube Q3.

Specifically, the third switch tube Q3 of the present application can be selected from, but not limited to, a triode, and the present application is not particularly limited thereto.

The present application further provides a power utilization and charging apparatus, comprising any of the PE line protection system for a power utilization and charging apparatus described above.

The description of the power utilization and charging apparatus provided in the present application can be found by referring to the above-mentioned embodiment of the PE line protection system, and the description thereof will not be repeated here.

It should also be noted that in this specification, relational terms such as first and second and the like are only used to distinguish one entity or operation from another entity or operation, and the existence of any such actual relationship or order between these entities or operations is not necessarily required or implied. Moreover, the term "comprise", "include" or any other variant intends to cover the non-exclusive inclusions, so that a process, a method, a commodity or a device comprising a series of elements comprise not only those elements, but also other elements not explicitly listed, or further comprise inherent elements of such process, method, commodity or device. An element that is defined by the phrase "comprising a . . . " does not exclude the presence of additional elements in the process, method, product, or equipment that comprises the element.

The above description of the disclosed embodiments enables those skilled in the art to implement or use the present application. Various modifications to these embodiments will be apparent to those skilled in the art, and the general principles defined herein may be implemented in other embodiments without departing from the spirit or scope of the present application. Accordingly, the present application will not be limited to the embodiments shown herein, but will conform to the widest scope consistent with the principles and novel features disclosed herein.

The invention claimed is:

1. A PE line protection system for a power utilization and charging apparatus comprising a driving circuit and a switch, wherein:

an input end of the driving circuit is connected to an output end of the power utilization and charging apparatus, a driving end of the driving circuit is connected to a control end of the switch, a first end of the switch is connected to an output end of the PE line, and a second end of the switch is connected to an input end of the PE line; and the driving circuit comprises a controllable switch module and a freewheeling circuit, wherein:

a control end of the controllable switch module is connected to the output end of the power utilization and charging apparatus, a first end of the controllable switch module is connected to a first control end of the switch and an input end of the freewheeling circuit respectively, a second end of the controllable switch module is grounded, an output end of the freewheeling circuit is connected to a second control end of the switch, and a common end is connected to a power supply;

the driving circuit controls the controllable switch module so as to turn off the controllable switch module upon reception of a signal transmitted by the power utilization and charging apparatus indicating the abnormal connection of the PE line, wherein when the controllable switch module is turned off the switch is de-energized such that the switch cuts off the PE line; and the freewheeling circuit releases electric energy stored by the switch after the switch is de-energized, so as to avoid damaging the controllable switch module.

2. The PE line protection system for a power utilization and charging apparatus according to claim 1, characterized in that, the controllable switch module comprises a first resistor and a first switch tube, wherein:

a first end of the first resistor is connected to the output end of the power utilization and charging apparatus, a second end of the first resistor is connected to a control end of the first switch tube, a first end of the first switch tube is connected to the first control end of the switch and the input end of the freewheeling circuit respectively, and a second end of the first switch tube is grounded.

3. The PE line protection system for a power utilization and charging apparatus according to claim 2, characterized in that, the controllable switch module further comprises a second resistor and a second switch tube, wherein:

a first end of the second resistor is connected to the first end of the first switch tube and a control end of the second switch tube respectively, a second end of the second resistor is connected to the power supply, a first end of the second switch tube is connected to the first control end of the switch and the input end of the freewheeling circuit respectively, and a second end of the second switch tube is grounded.

4. The PE line protection system for a power utilization and charging apparatus according to claim 3, characterized in that, the first switch tube and the second switch tube are both a triode, wherein:

a base electrode of the triode serves as a control end of the first switch tube and the second switch tube, a collector electrode of the triode serves as a first end of the first switch tube and the second switch tube, and an emitter electrode of the triode serves as a second end of the first switch tube and the second switch tube.

5. The PE line protection system for a power utilization and charging apparatus according to claim 1, characterized in that the freewheeling circuit is a first diode, wherein:

an anode of the first diode serves as the input end of the freewheeling circuit, and a cathode of the first diode serves as the output end of the freewheeling circuit.

6. The PE line protection system for a power utilization and charging apparatus according to claim 1, characterized in that the switch is one of a relay, a mos tube, a thyristor, a triode, or a combination thereof.

7. The PE line protection system for a power utilization and charging apparatus according to claim 1, characterized in that the PE line protection system for a power utilization and charging apparatus further comprises a detection circuit, wherein:

an input end of the detection circuit is connected to a control end of the power utilization and charging apparatus, and a detection end of the detection circuit is connected to the output end of the PE line; and the detection circuit is used for starting detection of an on-off state of the switch upon reception of a detection start signal transmitted by the power utilization and charging apparatus, and outputting a first detection value if it is detected that the switch is turned on; and outputting a second detection value if it is detected that the switch is turned off.

8. The PE line protection system for a power utilization and charging apparatus according to claim 7, characterized in that, the detection circuit comprises a third resistor, a fourth resistor, a third switch tube and a second diode, wherein:

a control end of the third switch tube is connected to the control end of the power utilization and charging apparatus, a first end of the third switch tube is connected to a first end of the third resistor, a second end of the third resistor is connected to a first end of the fourth resistor and a common end serves as an output end of the detection circuit, a second end of the fourth resistor is connected to a cathode of the second diode, an anode of the second diode is connected to the power supply, and a second end of the third switch tube is connected to the output end of the PE line; and the detection circuit is used specifically for turning on the third switch tube upon reception of the detection start signal transmitted by the power utilization and charging apparatus, to start detection of an on-off state of the switch, and outputting a first detection value if it is detected that the switch is turned on; and outputting a second detection value if it is detected that the switch is turned off.

9. The PE line protection system for a power utilization and charging apparatus according to claim 8, characterized in that, the third switch tube is a triode, wherein:

the base electrode of the triode serves as the control end of the third switch tube, the collector electrode of the triode serves as the first end of the third switch tube, and the emitter electrode of the triode serves as the second end of the third switch tube.

10. A power utilization and charging apparatus comprising a PE line protection system for a power utilization and charging apparatus according to claim 1.

* * * * *